(12) United States Patent
Benetti

(10) Patent No.: US 10,994,987 B2
(45) Date of Patent: May 4, 2021

(54) RIDING BRACKET

(71) Applicant: AMAHORSE TRADING S.R.L., San Giustino (IT)

(72) Inventor: Mauro Benetti, Lonato del Garda (IT)

(73) Assignee: Amahorse Trading S.R.L., San Giustino (IT)

( * ) Notice: Subject to any disclaimer, the term of this patent is extended or adjusted under 35 U.S.C. 154(b) by 135 days.

(21) Appl. No.: 16/095,192

(22) PCT Filed: Apr. 18, 2017

(86) PCT No.: PCT/IB2017/052206
§ 371 (c)(1),
(2) Date: Oct. 19, 2018

(87) PCT Pub. No.: WO2017/182942
PCT Pub. Date: Oct. 26, 2017

(65) Prior Publication Data
US 2019/0144259 A1    May 16, 2019

(30) Foreign Application Priority Data

Apr. 22, 2016 (IT) .......................... 102016000042022

(51) Int. Cl.
*B68C 3/02* (2006.01)
*F16B 45/02* (2006.01)

(52) U.S. Cl.
CPC ................ *B68C 3/02* (2013.01); *F16B 45/02* (2013.01)

(58) Field of Classification Search
CPC ..... B68C 3/02; B68C 3/00; B68C 2003/0041; B68C 2003/005; B68C 2003/0058; F16B 45/02
See application file for complete search history.

(56) References Cited

U.S. PATENT DOCUMENTS

| 478,633 | A | * | 7/1892 | Peacock | ................ B68C 3/0016 54/49 |
| 1,088,552 | A | * | 2/1914 | Dolan et al. | .............. B68C 3/02 54/49 |

(Continued)

FOREIGN PATENT DOCUMENTS

| DE | 7119888 U | 9/1971 |
| DE | 202010000928 U1 | 4/2010 |

(Continued)

OTHER PUBLICATIONS

International Search Report and Written Opinion for PCT/IB2017/052206 dated Jul. 17, 2017.

*Primary Examiner* — Son T Nguyen
(74) *Attorney, Agent, or Firm* — Thomas|Horstemeyer LLP

(57) ABSTRACT

Horse-riding stirrup comprising a stirrup frame (2) which comprises a hooking portion (4) to a stirrup leather (100), a first side arm (6) and a support arm (8) connected to each other in an incident manner to define a frame compartment (10) engageable by a user's foot; a second side arm (12) comprising an articulation end (14) pivoted to the stirrup frame, and a free end (16) rotatable between a coupling configuration to the support arm and a release configuration therefrom in which the arm is spaced from the support arm to create a lateral disengagement opening (18) of the foot from the compartment. The second side arm comprises a flexible portion (20) which in the coupling configuration presses the free end in abutment with the support arm and which, in order to achieve the release configuration, allows the second side arm to bend in part to snap-disengage the free end from the support arm.

20 Claims, 7 Drawing Sheets

(56) References Cited

U.S. PATENT DOCUMENTS

| | | | | |
|---|---|---|---|---|
| 3,905,179 A | * | 9/1975 | Bischeltsrieder | B68C 3/00 54/47 |
| 3,910,015 A | * | 10/1975 | Ebejer | B68C 3/02 54/49 |
| 6,698,169 B1 | * | 3/2004 | Bostock | B68C 3/02 54/49 |
| 2005/0076620 A1 | * | 4/2005 | Sjosward | B68C 3/02 54/48 |
| 2005/0081493 A1 | * | 4/2005 | Chang | B68C 3/00 54/48 |

FOREIGN PATENT DOCUMENTS

| | | |
|---|---|---|
| FR | 715689 A | 12/1931 |
| FR | 1226574 A | 7/1960 |
| GB | 709097 A | 5/1954 |
| WO | 201013909 A1 | 12/2010 |

* cited by examiner

RIDING BRACKET

CROSS-REFERENCE TO RELATED APPLICATION

This application is the 35 U.S.C. § 371 national stage application of PCT Application No. PCT/I B2017/052206, filed Apr. 18, 2017, where the PCT claims the priority to and benefit of Italian Patent Application No. 102016000042022, filed Apr. 22, 2016, both of which are herein incorporated by reference in their entireties.

The present invention relates to a horse-riding stirrup.

Horse-riding stirrups of various types are known, which, by hanging from corresponding stirrup leathers along the flanks of the horse, make it possible to control the animal in performing various horse-riding disciplines.

Most traditional stirrups comprise a closed-loop structure, which generally receives inside itself and supports part of a user's boot.

A widespread problem in the use of the stirrups of the prior art is that it is difficult, or even impossible, to extract the boot from the stirrup in the event of a fall, for example with the leg facing upwards.

More precisely, in the absence of outside help, disengaging the boot and foot from the stirrup is an extremely difficult undertaking, especially because of the position of the user in such condition and, in the worst circumstances, on account of the movements of the horse.

The present invention lies therefore in the above context, proposing to provide a "safety" horse-riding stirrup, the frame of which is open on one side (being for example in the shape of a "C"), said side being closed in such a manner that it can be opened by means of a swivel arm configured to allow a lateral disengagement of the user's foot.

Such objective is achieved by a horse-riding stirrup according to claim 1. The dependent claims show preferred embodiment variants.

The object of the present invention will now be described in detail, with the help of the appended drawings, wherein.

Figure 1:
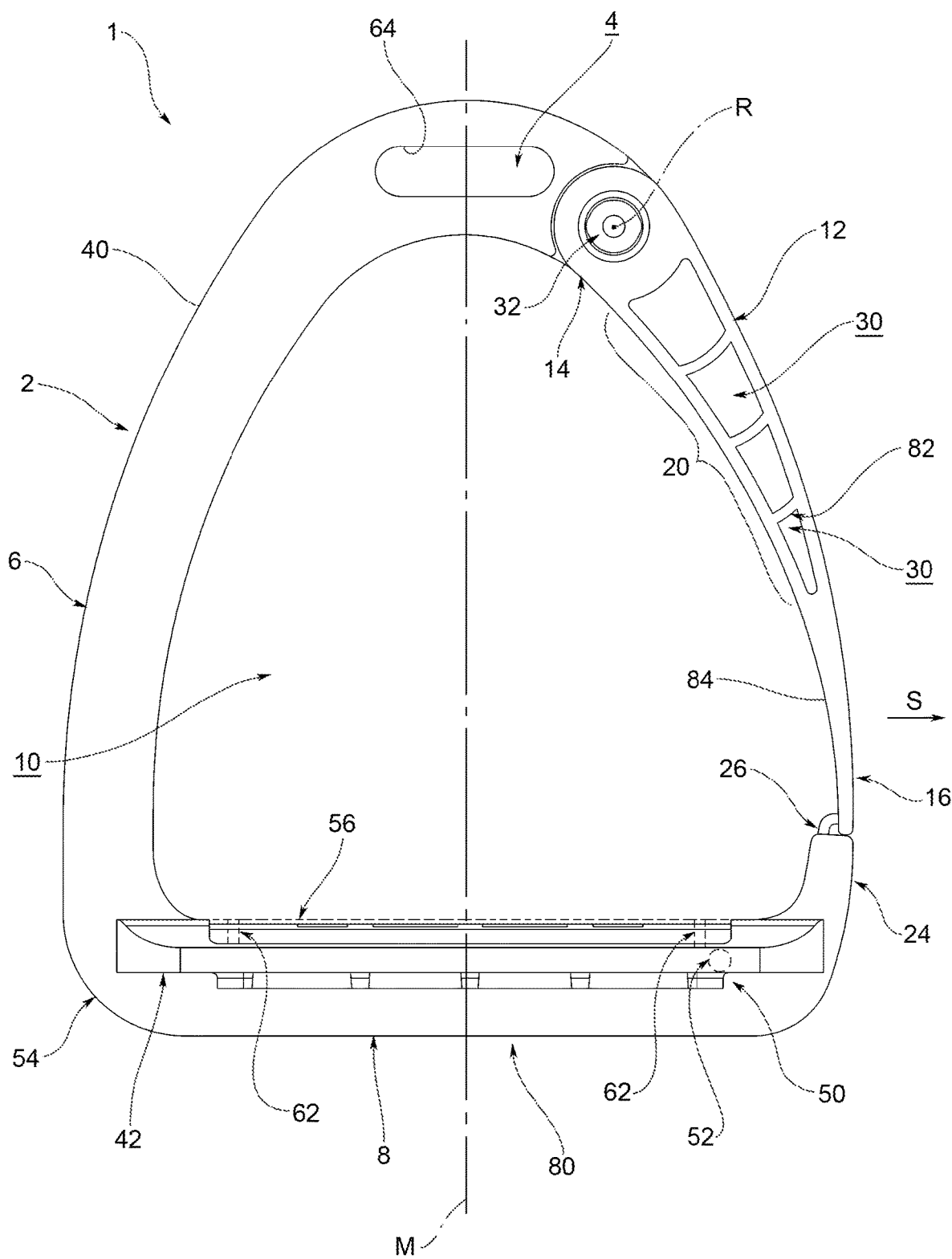
FIGS. 1 and 2 show front views of a stirrup, the subject of the present invention, according to one possible embodiment, where the safety arm is respectively placed in the coupling configuration and in the release configuration.

With reference to the aforementioned drawings, reference numeral 1 globally denotes a horse-riding stirrup.

Figure 3:
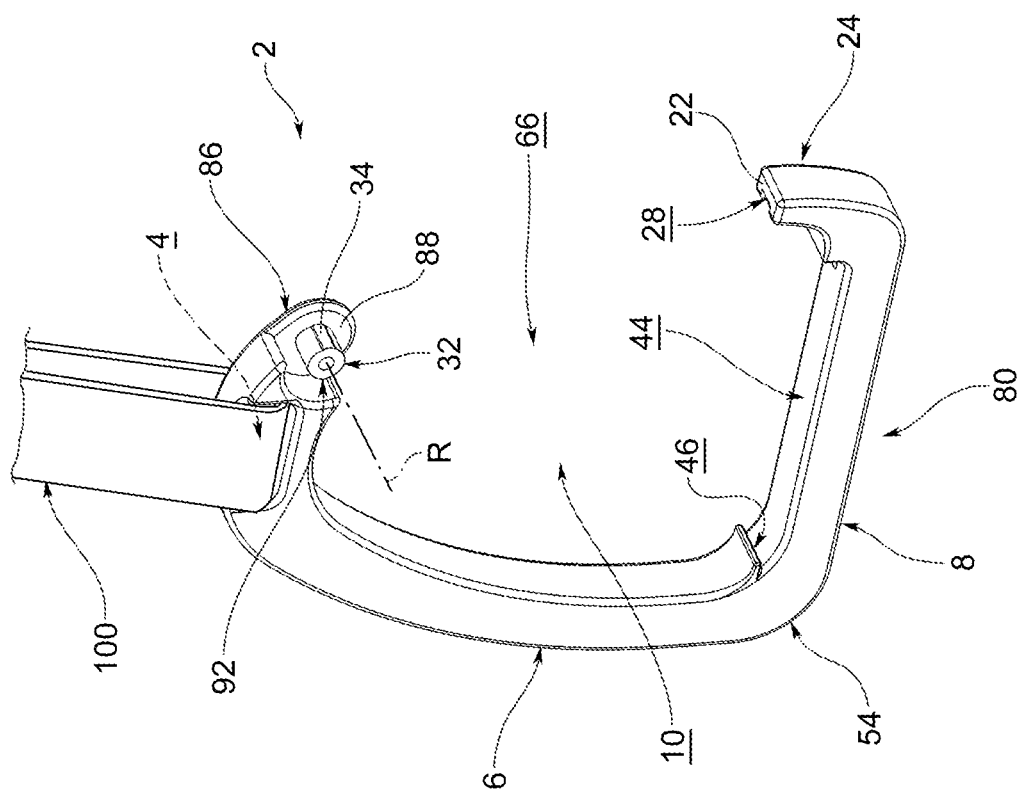
Figure 5:
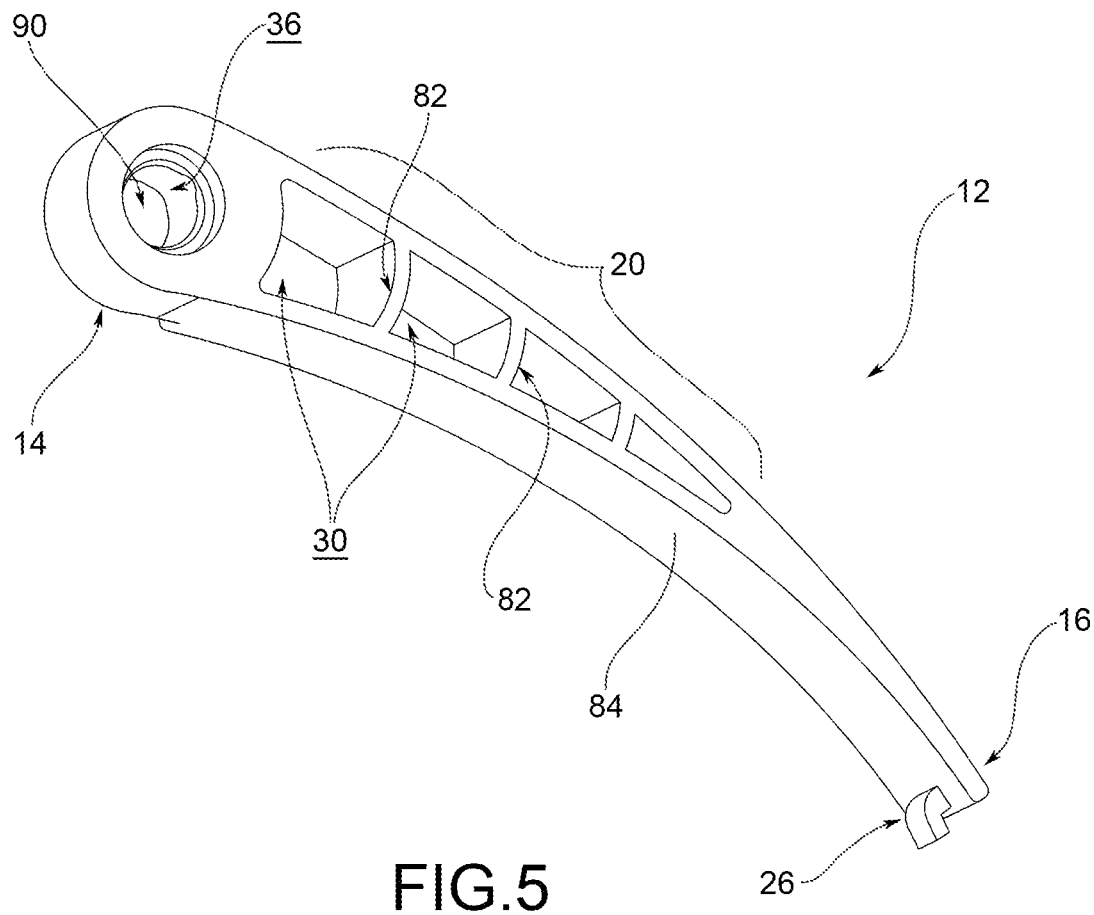
FIGS. 5 and 6 represent a safety arm according to the variant in FIG. 1, in a perspective and plan view.
Figure 6:
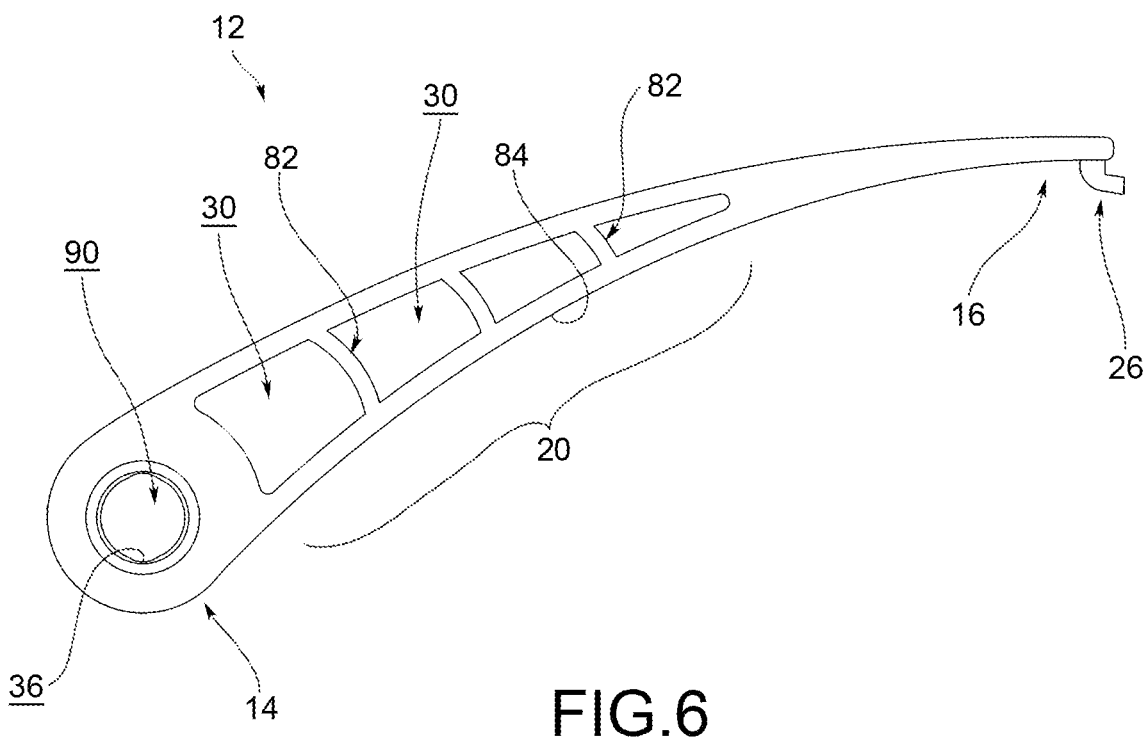

Such stirrup 1 comprises a stirrup frame 2 which comprises a hooking portion 4 to a stirrup leather 100 (for example schematically shown in FIG. 3), a first side arm 6 and a support arm 8 connected to each other in an incident manner to define a frame compartment 10 engageable (to be specific, which can be traversed) by a user/rider's foot;

According to a preferred variant, the first side arm and the support arm 8 are integrally joined, substantially in a permanent manner.

According to a preferred further variant, the first 6 side arm 6 and the support arm 8 are made in one piece, at least partially of the same material.

Figure 4:
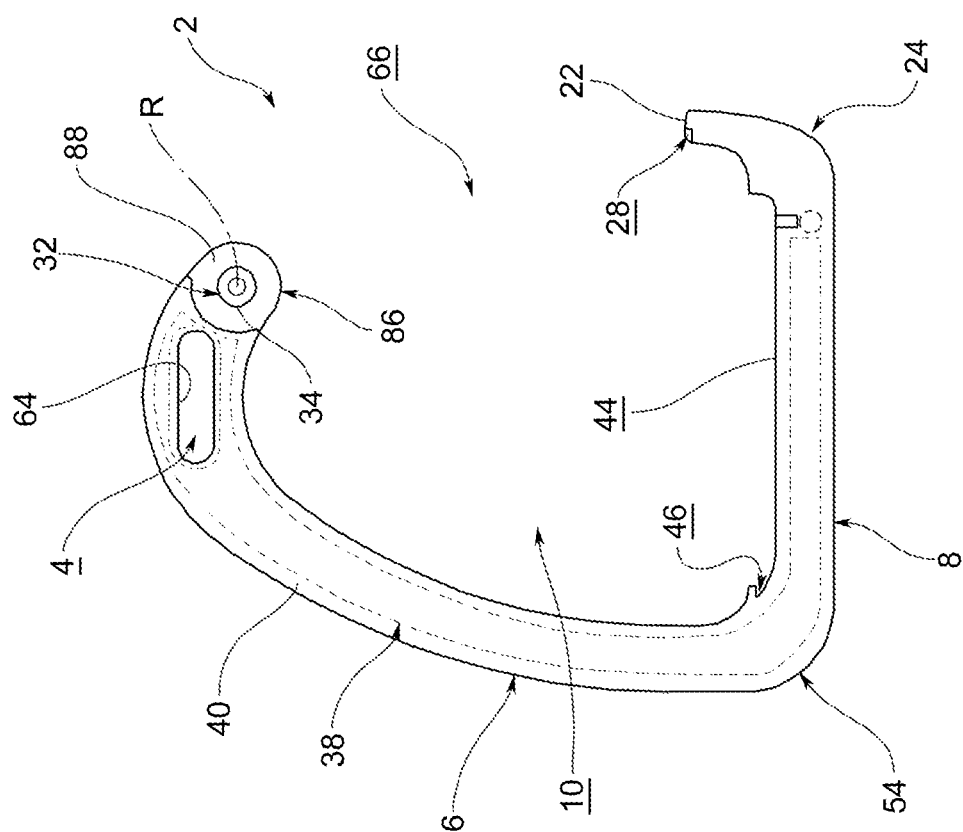
FIGS. 3 and 4 show a stirrup frame according to a possible variant, in perspective and in plan view, where all the other components have been omitted.

With reference to the variant in FIG. 4, the stirrup frame 2 delimits a frame opening 66 at the side opposite the first side arm 6, where the first side arm 6 and the support arm 8 are mutually separated.

The stirrup frame 2 could therefore have a single first side arm 6 connecting the hooking portion 4 and the support arm 8. For example, such frame could have a general "C" or "L" shape.

In the embodiment shown, the hooking portion 4 comprises or consists of at least one hole or slot that crosses at least partly (for example completely) the thickness of the stirrup frame 2.

According to one embodiment, an upper edge 64 delimiting the hole or slot of the hooking portion 4 on one side is tilted with respect to a horizontal plane and/or relative to the support arm 8, specifically to enable a better balancing of the stirrup 1 in relation to the stirrup leather 100.

Preferably, the stirrup frame 2 is made mainly or completely of a polymer material.

According to an advantageous variant, the stirrup frame 2 comprises a reinforcement core 38, preferably metallic, to which a polymeric material 40 is co- or over-moulded.

According to a further non-shown embodiment, the reinforcement core 38 is only partly incorporated in the polymeric material 40, so that it emerges in part from said material.

According to a further embodiment, the reinforcement core 38 is entirely incorporated in the polymeric material 40. In this regard, such core 38 may delimit a plurality of anchorage openings 78 (e.g. circular) configured to permit the receipt of polymeric material inside them, and thus ensure better adhesion of the co- or over-moulded material to the reinforcement core 38.

In the embodiments shown, the reinforcement core 38 extends from the hooking portion 4 along the first side arm 6 and along at least part of the support arm 8.

Advantageously, the reinforcement core forms at least part of the hooking portion 4, specifically surrounding at least partially the aforesaid hole or slot, or delimiting a core hole or slot 68 having a lumen at least partially aligned with the lumen of the hole or slot of the hooking portion 4.

Figure 2:
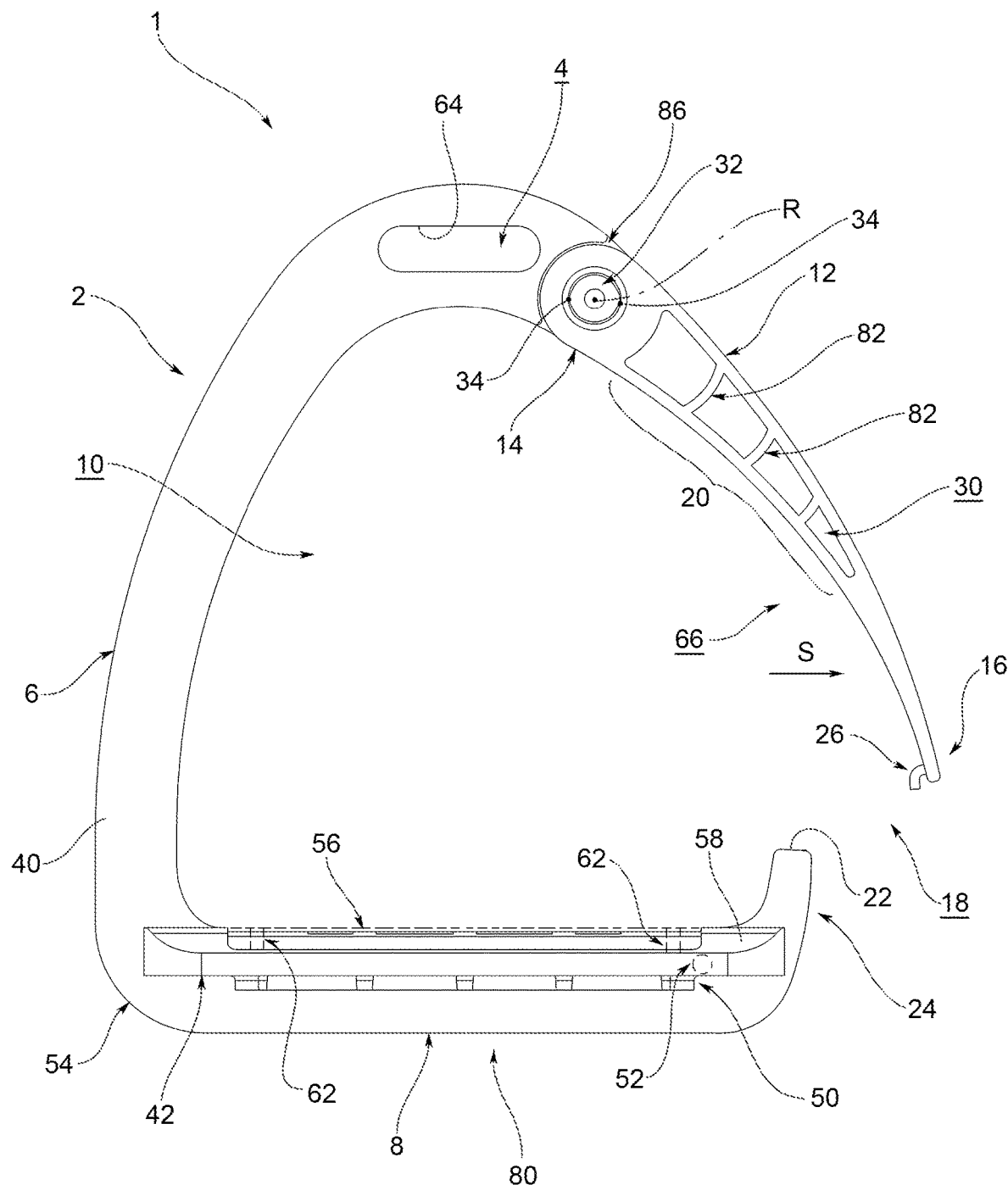

According to the embodiment shown in FIG. 2, the stirrup 1 comprises at least a bench or support element 42 for the user's foot, mounted on the support arm 8 and preferably shape-coupled with an element seat 44 of said arm 8.

Figure 7A:
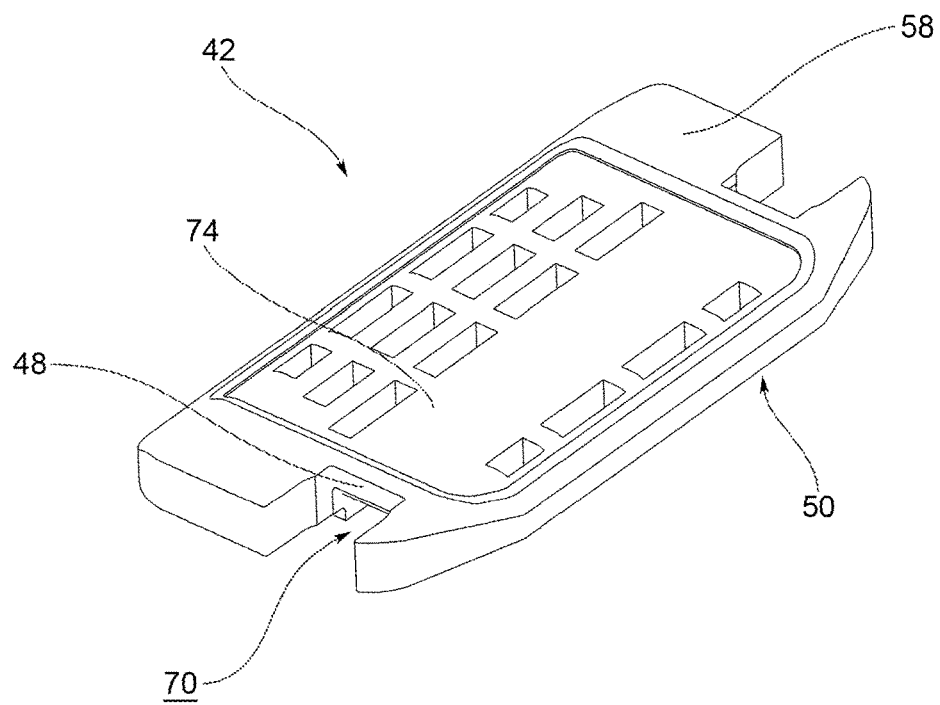
FIGS. 7A and 7B illustrate a perspective and a plan view from below of a support element, according to one embodiment.
Figure 7B:
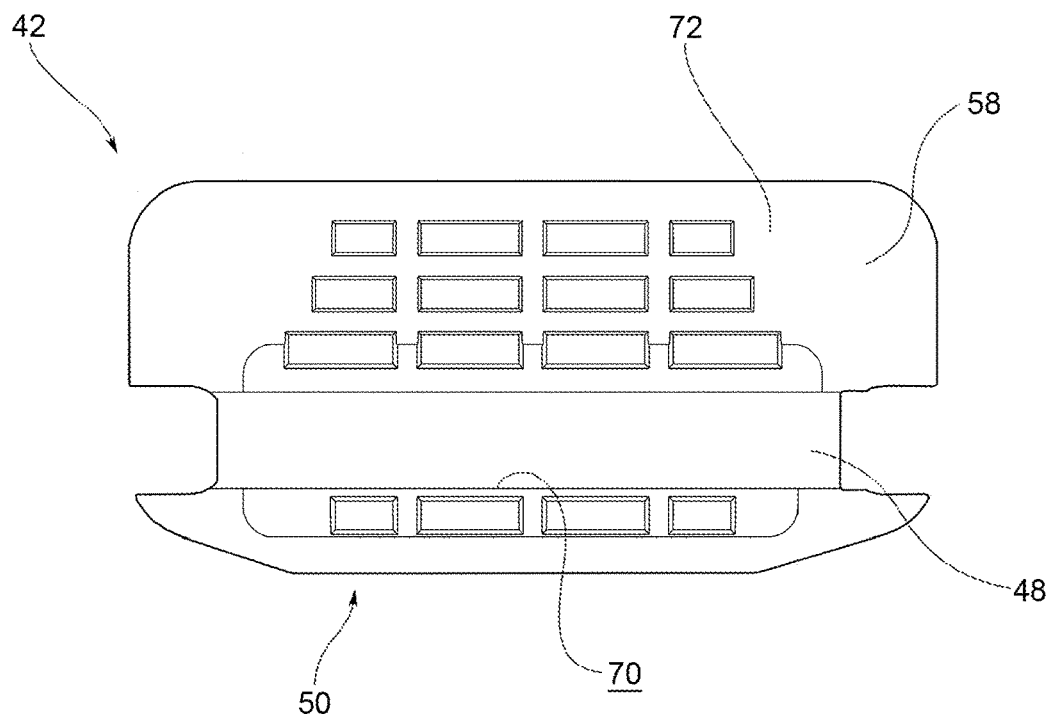
Figure 8:
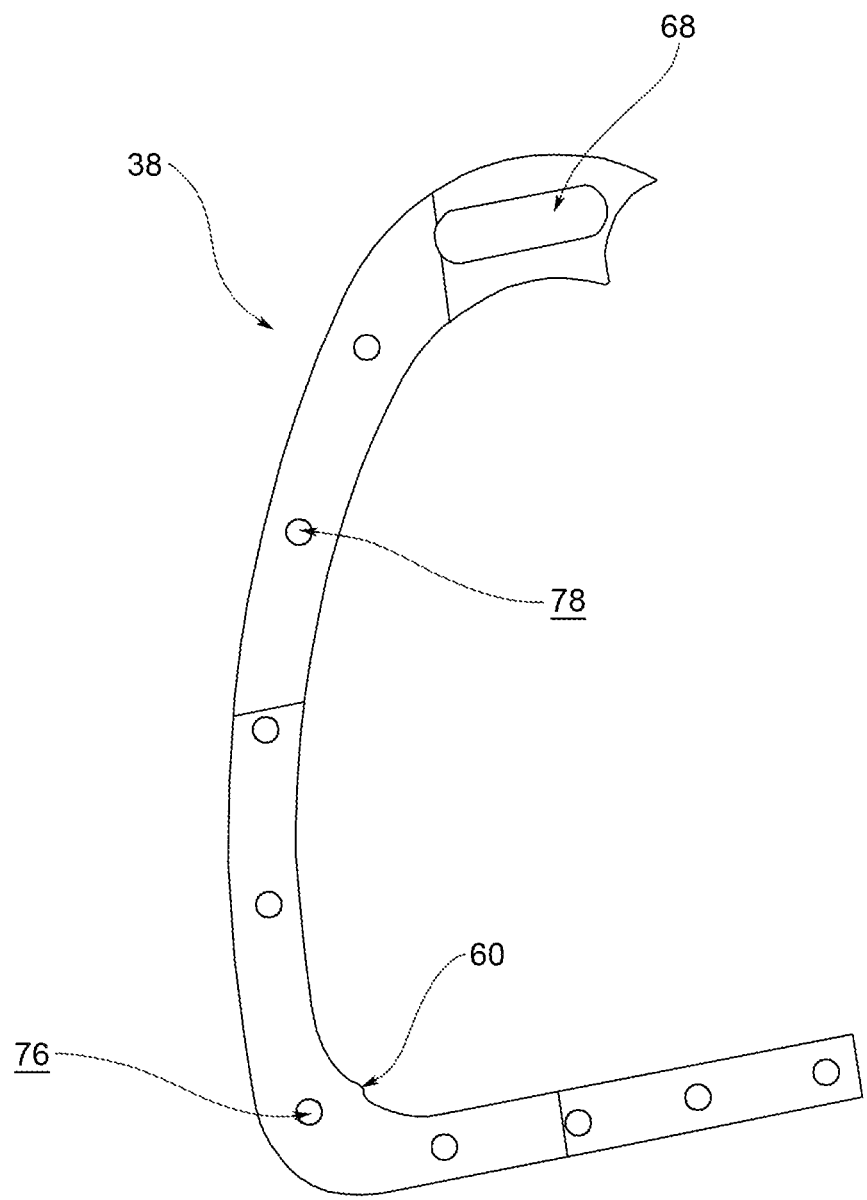
FIG. 8 shows a plan view of a reinforcement core according to one embodiment, for example shown by the dotted line in FIG. 2.
Figure 9:
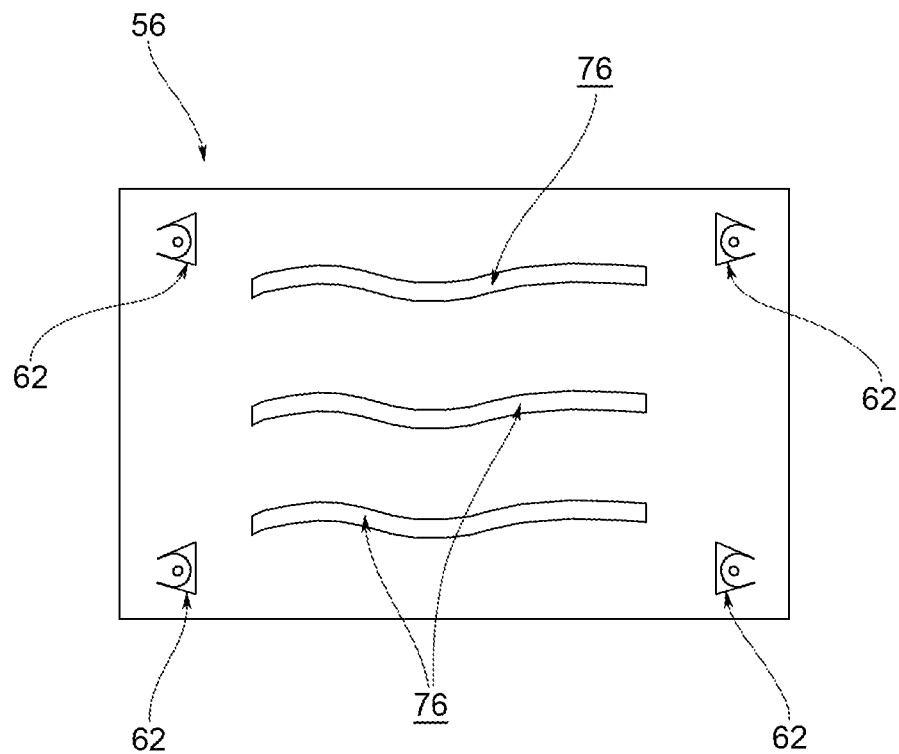
FIGS. 9 and 10 show schematic figures in plan and lateral views of a cover sheet, preferably metallic, attached to the support element according to a possible variant.

With reference to FIG. 7 for example, the support element 42 could delimit a longitudinal groove 70 receiving at least part of the support arm 8.

Advantageously, the element seat 44 (e.g. lowered), receives at least a portion of the support element 42.

Preferably the longitudinal groove 70 crosses at least partly (for example completely) the support element 42.

Advantageously, the longitudinal groove 70 is accessible from a lower surface 72 of the support element 42, facing the side opposite a support surface 74 of the user's foot, delimited by said element 42.

The element seat 44 is advantageously delimited by an undercut portion 46 in which a portion 48 (for example a tapered portion) of the support element 42 is wedged on one side.

For example, said portion 48 could be housed in the undercut portion 46, after which the support element 42 could be rotated relative to the support arm 8 to occupy the element seat 44 and, more specifically, to accommodate the remaining part of the support arm 8 inside the longitudinal groove 70.

According to a variant, another portion 50 (for example an opposite portion to the optionally tapered portion 48) of the support element 42 could instead be constrained to the support arm 8 using one or more mechanical fastenings 52 which extend through the thickness of the stirrup frame 2.

For example, the mechanical fastenings 52 could comprise one or more screws.

Advantageously, the mechanical fastenings 52 extend through the thickness of the support arm in a direction approximately parallel to the support surface 74 of the support element 42.

Preferably, the mechanical fastenings 52 are arranged at a distance from a connection zone 54 between the first side arm 6 and the support arm 8, for example at an end portion 24 or intermediate portion 80 of the support arm 8.

According to a further advantageous variant, the undercut portion 46 is arranged in the connection zone 54 between the first side arm 6 and the support arm 8. According to this embodiment, the connection zone 54 is therefore preferably devoid of mechanical fastenings to avoid weakening the mechanical strength of such zone, where the greatest mechanical stresses of the user on the stirrup 1 are concentrated.

According to yet a further variant, the reinforcement core 38 could comprise at least one lug 60 (in the case in point projecting towards the frame compartment 10) which delimits in part the undercut portion 46 and which realizes an abutment surface to prevent the disengagement of the support element.

According to a variant only schematically shown in FIG. 1, the support element 42 may be partially covered by a cover sheet 56, preferably metallic. For example, the cover sheet 56 could be at least partially made of steel.

Optionally, the cover sheet 56 could be perforated through its thickness, or could comprise one or more slits 76, preferably oriented along the support arm 8.

According to one embodiment, the cover sheet 56 comprises coupling portions 62, bent outwards (i.e. outside the plane which the sheet extends in) which, according to a further variant, could be at least partly incorporated in a polymer material 58 which the aforesaid support element 42 is at least partly made of.

Figure 10:

Advantageously, the coupling portions 62 are cut from the cover sheet 56 itself (e.g. by die-cutting), and then bent towards the outside of the sheet as described above and as shown in FIG. 10.

The stirrup 1 further comprises a second side arm 12 or safety arm, comprising an articulation end 14 pivoted to the stirrup frame 2 about an axis of rotation R, and a free end 16 rotatable between a coupling configuration to the support arm 8 and a release configuration of such arm 8.

To such purpose, the stirrup frame 2 delimits a rotation pin 32 around the aforesaid axis R which is preferably housed in the thickness of the frame 2.

More precisely, the rotation pin 32 is positioned at a support appendage 86, slimmer than the thickness of the stirrup frame 2.

Advantageously, such support appendage 86 delimits a sliding track 88 for the second side arm, which preferably extends annularly around the pin 32.

In the embodiments shown, through the stirrup frame 2, a centreline plane M is visible between the first 6 and the second side arm 12, when the latter is in the coupling configuration.

Preferably, the axis of rotation R of the second side arm 12 is substantially parallel (and preferably non-coincidental) to the centreline plane M.

According to a further variant, the axis of rotation R is placed at the hooking portion 4, shifted towards the second arm 12, specifically outside the centreline plane M.

In the coupling configuration (for example as schematized in FIG. 1) the second side arm 12 encloses the frame compartment 10 with the first side arm 6 and the support arm 8. Conversely, in the release configuration shown in FIG. 2, the second arm 12 is distanced from the support arm 8 to create a side disengagement opening 18 of the user's foot from the aforesaid frame compartment 10.

In the case in point, in the release configuration the free end 16 of the second side arm 12 is distanced from the support arm 8 to create the aforesaid opening 18.

According to a preferred embodiment, the free end 16 of the second side arm 12 and an end portion 24 of the support arm 8 comprise complementary fastening means 26, 28 which cooperate with each other—as a result of a shape and/or force coupling—in the coupling configuration.

In the variants shown, the complementary fastening means comprise a substantially hooked portion 26 placed at the free end 16 (and preferably facing inwards towards the first side arm 6), and a corresponding recess 28 delimited by the support arm 8.

Advantageously, said recess is facing the frame compartment 10.

According to the invention, the second side arm 12 comprises at least one flexible portion 20.

According to one embodiment, the second side arm 12 is made mainly or solely of an elastomer material, which makes the flexible portion 20.

According to a further embodiment, between the articulated end 14 and the free end 16, the second side arm 12 delimits one or more structural lightening portions 30 which form the flexible portion.

In the variants shown, the structural lightening portions 30 are shown in the form of a cavity extending partially or completely through the thickness of the second side arm 12.

According to a preferred variant, at least one pair of adjacent structural lightening portions 30 may be separated by a separation rib 82.

According to an advantageous embodiment, the flexibility of the flexible portion 20 is adjustable by selecting a higher/lower density distribution of the aforesaid lightening holes 30 along the respective arm 12.

In the coupling configuration, the flexible portion 20 presses the free end 16 against the support arm 8.

This way the portion 20 makes the free end 16 exert a thrust on the support arm 8.

Conversely, to reach the release configuration, the flexible portion 20 allows the second side arm 12 to bend partially to release (preferably: snap) the free end 16 from the support arm 8, thus creating the side disengagement opening 18.

For example, the movement of the second side arm 12 between the aforesaid configurations may occur as a result of a solicitation on said arm 12 in a direction S opposite to the first side arm 6, towards the outside of the frame compartment 10.

The flexible portion 20 thus exercises a fundamental function in all configurations, as it actively contributes to the maintenance of the coupling configuration and reactively permits the release of the second side arm 12 from the support arm 8.

According to a preferred variant, in the coupling configuration, the flexible portion 20 of the second side arm 12 is pressed (or compressed) between the axis of rotation R of said arm, and a contact surface 22 identified by the support arm 8.

For example, the contact surface 22 may circumscribe partly (for example above) the recess 28 delimited by the support arm 8.

According to one embodiment, in the coupling configuration the second side arm 12 is curved, in particular with its concave surface 84 facing the frame compartment 10.

According to this variant, the flexible portion 20 allows the second arm 12 to temporarily reduce its curvature radius to release the free end 16 from contact with the support arm 8.

The articulation end 14 of the second side arm 12 is preferably fitted on the rotation pin 32. In the case in point, the articulation end 14 delimits a substantially circular cavity 90, preferably a through cavity, embracing the rotation pin 32.

According to a variation not shown, at a free pin end 92 of the rotation pin 32 a mechanical means (e.g. a screw and/or a plate) could be attached to axially hold the second side arm 12 of the stirrup frame 2.

In the embodiments shown, the pin 32 demits at least one radial projection 34 (or radial cavity) which in the coupling configuration is inserted in at least one radial cavity 36 (or which houses a radial projection) of the articulation end 14 so that the second side arm 12 achieves discrete coupling and release configurations.

Innovatively, the stirrup described makes it possible to achieve the objectives set.

In particular, the safety arm makes it possible to liberate an additional access to the stirrup compartment so as to allow an easier release of the user's foot.

Advantageously, the stirrup of the present invention is constructively simple, and therefore economical to produce with repetitive and automated operations.

Advantageously, the stirrup of the present invention allows for very precise fine tuning adjustments.

Advantageously, the stirrup of the present invention has been designed to snap open and to be reassembled in the coupling configuration from the release configuration to be used again.

Advantageously, the stirrup of the present invention comprises the second side arm which is held firmly in the coupling configuration and which allows the foot to be firmly held at least on a par with conventional stirrups.

Advantageously, the stirrup of the present invention makes it possible to adjust the flexibility of the second arm in a targeted and precise manner.

Advantageously, through appropriate selection of the structural lightening portions, and therefore in a non-invasive manner, the stirrup of the present invention makes it possible to design a range of products for different users, for example of different weights.

Advantageously, the stirrup of the present invention has been conceived to be mountable without weakening the major structural components.

Advantageously, the stirrup of the present invention has high mechanical resistance.

Advantageously, the stirrup of the present invention is extremely light.

Advantageously, the stirrup of the present invention achieves a good balance with respect to the stirrup leathers, despite being an asymmetrical component in relation to a central plane.

Advantageously, the presence of a non-slip element improves the grip on the stirrup bar.

A person skilled in the art may make variations or replacements of elements with others functionally equivalent to the aforementioned embodiments of the stirrup so as to satisfy specific requirements.

Such variants are also contained within the scope of protection as defined by the following claims.

In addition, each variant described as belonging to a possible embodiment may be realised independently of the other embodiments described.

The invention claimed is:

1. A horse-riding stirrup comprising:
   a stirrup frame which comprises a hooking portion configured to attach to a stirrup leather, a first side arm and a support arm connected to each other in an incident manner to define a frame compartment engageable by a user's foot;
   a second side arm comprising an articulation end pivoted to the stirrup frame about an axis of rotation, and a free end rotatable between a coupling configuration to the support arm in which the second side arm encloses the frame compartment with the first side arm and the support arm, and a release configuration in which said second side arm is spaced from the support arm to create a lateral disengagement opening of the user's foot from said frame compartment;
   wherein the second side arm comprises at least a flexible portion which, in the coupling configuration, presses the free end in abutment with the support arm to exert a force to maintain the coupling configuration and which, in order to achieve the release configuration, allows the second side arm to bend in part to snap disengage the free end from the support arm,
   wherein, between the articulated end and the free end, the second side arm delimits one or more structural lightening portions, which form the flexible portion,
   wherein said one or more structural lightening portions comprise cavities extending partially or completely through a thickness of the second side arm,
   wherein a flexibility of the flexible portion is adjustable by selecting a higher or lower distribution density of said one or more structural lightening portions along said second side arm, and wherein a width of the cavities reduces converging towards the free end.

2. The stirrup according to claim 1, wherein, in the coupling configuration, the flexible portion of the second side arm is pressed between the axis of rotation of said second side arm, and a contact surface delimited by the support arm.

3. The stirrup according to claim 1, wherein the second side arm is curved in the coupling configuration, and wherein said flexible portion enables said second side arm to transiently reduce its radius of curvature to free the free end from contact with the support arm.

4. The stirrup according to claim 1, wherein the free end of the second side arm and an end portion of the support arm comprise complementary fastening means which cooperate with each other in the coupling configuration.

5. The stirrup according to claim 4, wherein the complementary fastening means comprise a substantially hooked portion placed at the free end and facing the first side arm, and a corresponding recess delimited by the support arm.

6. The stirrup according to claim 1, in which the stirrup frame delimits a rotation pin around said axis of rotation on which the articulation end of the second side arm is coaxially fitted, said rotation pin delimiting at least one radial projection, which in the coupling configuration is inserted in at least one radial cavity of the articulation end, so that the second side arm achieves the coupling and release configurations.

7. The stirrup according to claim 1, wherein a centerline plane is detectable through the stirrup frame between the first and the second side arms in the coupling configuration, the axis of rotation being located at the hooking portion, shifted towards said second side arm outside said centerline plane.

8. The stirrup according to claim 1, wherein the stirrup frame is made mainly or completely of a polymer material.

9. The stirrup according to claim 1, wherein the stirrup frame comprises a reinforcement core to which a polymer material is co-moulded or over-moulded, said reinforcement core extending from the hooking portion along the first side arm and along at least part of the support arm.

10. The stirrup according to claim 9, wherein the reinforcement core is metallic.

11. The stirrup according to claim 1, wherein the second side arm is made mainly or solely of an elastomer material, which makes the flexible portion.

12. The stirrup according to claim 1, comprising a support element for the user's foot, fitted to the support arm and shape-coupled with an element seat of said support arm.

13. The stirrup according to claim 12, wherein the element seat is delimited by an undercut portion in which a portion of the support element is wedged on one side, another portion of said support element being constrained to the support arm by means of one or more mechanical fastenings which extend through a thickness of the stirrup frame.

14. The stirrup according to claim 13, wherein the undercut portion is placed in a connection zone between the first side arm and the support arm, devoid of mechanical fastenings to prevent weakening the mechanical strength of said connection zone.

15. The stirrup according to claim 13, wherein the stirrup frame comprises a reinforcement core to which a polymer material is co-moulded or over-moulded, said reinforcement core extending from the hooking portion along the first side arm and along at least part of the support arm, and wherein the reinforcement core comprises at least one lug which partially delimits the undercut portion.

16. The stirrup according to claim 1, comprising a support element for a rider's foot, fitted to the support arm, said support element being partially covered by a metal cover sheet, the metal covering sheet comprising coupling portions folded outwardly of said sheet being at least partially embedded in a polymer material which said support element is at least partially made of.

17. The stirrup according to claim 16, wherein the metal cover sheet is perforated through its thickness.

18. The stirrup according to claim 1, wherein the free end is configured to disengage from the support arm as a result of a stress in a direction opposite the first side arm.

19. The stirrup according to claim 1, wherein the one or more structural lightening portions are in the form of a recess.

20. The stirrup according to claim 1, in which the stirrup frame delimits a rotation pin around said axis of rotation on which the articulation end of the second side arm is coaxially fitted, said rotation pin delimiting at least one radial cavity, which in the coupling configuration is accommodates a radial projection, of the articulation end, so that the second side arm achieves the coupling and release configurations.

* * * * *